E. CHAPMAN.
Improvement in Mechanical Movement.
No. 123,237. Patented Jan. 30, 1872.

Witnesses,
Chas H Smith
Geo. D. Walker

Inventor
Edwin Chapman
Lemuel W. Serrell
att'y

UNITED STATES PATENT OFFICE.

EDWIN CHAPMAN, OF ROCHESTER, MINNESOTA, ASSIGNOR TO HIMSELF, ALLEN K. WILLIAMS, JAMES M. WILLIAMS, AND CHARLES H. CHADBOURN, OF SAME PLACE.

IMPROVEMENT IN MECHANICAL MOVEMENTS.

Specification forming part of Letters Patent No. 123,237, dated January 30, 1872.

*To all whom it may concern:*

Be it known that I, EDWIN CHAPMAN, of Rochester, in the State of Minnesota, have invented an Improved Intermittent Mechanical Movement; and the following is declared to be a correct description of the same.

Mechanical movements have been made in which a continuously-revolving wheel gives to a second wheel a partial or complete revolution, and then holds the same motionless during a portion of the revolution of the motor; but in these cases the teeth of one wheel passing into gear with those of the other wheel are liable to strike into each other incorrectly and break, or else the momentum of one portion in striking against the other causes the end of the concave arc of the wheel that is moved to become rounding and produce a looseness in the second wheel. My invention is made for the purpose of preventing these difficulties; and consists in a revolving wheel with teeth upon a portion of its periphery, and with the plain portion or arc of less radius, in combination with a wheel that is moved by the contact of the teeth of the motor-wheel, and is provided with a concave arc projecting beyond the gear-teeth, so that the end of the tooth-segment of the motor-wheel passes between the projecting end of the concave arc and the teeth of the wheel to be moved, and the teeth come correctly into gear, because the impact is against the projecting stem of the concave arc instead of being against the teeth themselves.

Figure 1:
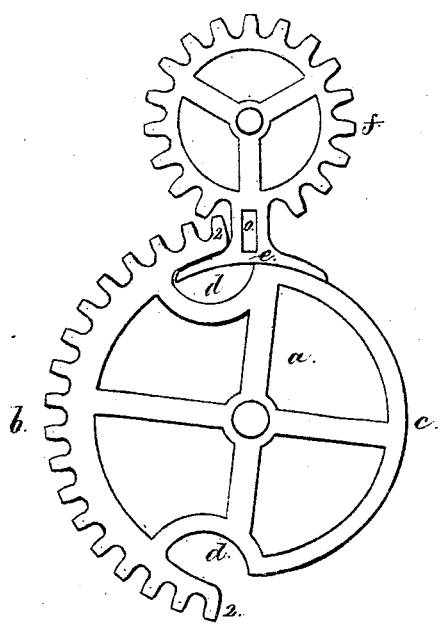
Figure 2:
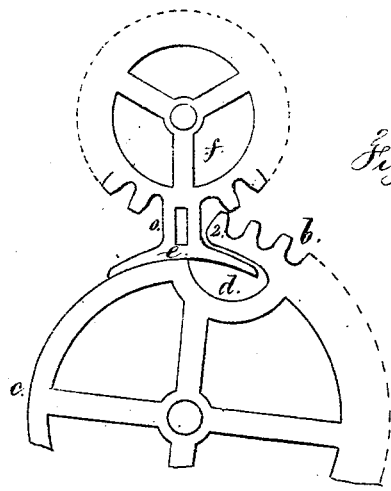

In the drawing, Figure 1 is an elevation of the gear-wheels as they come into contact; and Fig. 2 shows a portion of the wheels as the motor passes from the wheel that has been moved around and arrived at a point of rest- The wheel $a$ is the motor, and upon it is a segment, $b$, of teeth and an arc, $c$, or smooth periphery, and between them are the depressions $d$ in which the ends of the concave arc $e$ upon the wheel $f$ swing at the commencement and termination of the movement of the wheel $f$. The teeth upon the wheel $f$ are of a proper size and number to gear into the teeth $b$. The wheel $f$ may have more than one projecting concave arc, $e$, and the wheel $a$ may have more than one segment of teeth with intervening arcs, and the number of teeth will depend upon the circumstances, and the wheel that is moved may make only one pause each revolution, or two or more, and they may be uniform or varying, but under all circumstances the projecting end 2 of the segment $b$ passes over the end of the concave arc $e$ and the impact is against the stem $o$ of the arc $e$. Thereby the concussion does not come upon the teeth themselves, and in stopping the movement of the wheel $f$ the concave arc $e$ takes such an extended bearing upon the periphery $c$ that injury is prevented and the wheel $f$ is held very firmly while at rest.

I claim as my invention—

The wheel $a$, with the segmental gear $b$ projecting at its ends and the arc $c$, in combination with the wheel $f$ and the concave arc $e$ projecting from the stem $o$, substantially as and for the purposes set forth.

Signed by me this 27th day of November, A. D. 1871.

EDWIN CHAPMAN.

Witnesses:
GEO. T. PINCKNEY,
CHAS. H. SMITH.